United States Patent [19]
De Lima

[11] Patent Number: 6,099,120
[45] Date of Patent: Aug. 8, 2000

[54] GOGGLE FRAMES WITH QUICK FITTING SIDES

[76] Inventor: Luiz Carlos De Lima, R: João De Paula Franco, 515, São Paulo, SP 04775/050, Brazil

[21] Appl. No.: 08/735,023

[22] Filed: Oct. 22, 1996

[51] Int. Cl.[7] ..................................................... G02C 5/22
[52] U.S. Cl. .............................. 351/153; 351/140; 16/228
[58] Field of Search ............................. 351/41, 140, 153, 351/111, 116, 44; 16/228

[56] References Cited

PUBLICATIONS

"Caribe, O Único Óculos Totalmente Reaproveitável.", brochure, published Jan. 1996. (with two page English translation).

"Caribe, Segurança Para Seus Olhos", published Jan. 1996 (with four–page English translation).

*Primary Examiner*—Hung Xuan Dang
*Attorney, Agent, or Firm*—Merchant & Gould P.C.

[57] ABSTRACT

A goggle frame with quick fitting sides includes comprised of a conformation (1) joint to a goggle frame (2), basically composed by two horizontal and parallel plans (3) structured by a cross front-vertical blade (4), by a narrow side with elongated superior profile (5) and by a thin blade (6), with said profile (5) receiving the fitting of side (7) which trespass the hole where the transparent lens will be fitted, which end is provided with a reinforced conformation (8) and with an edge (9) to its fitting slightly inwards which, with the lens replacement, prevents the eventual escape and the fall of the goggles, said blade (6) operating as rotating limiter and preventing that the sides open more than the desired angle, which development has as purpose to make very easier the process of assembly and even the exchange of broken sides in the goggles frame, making them fully dismountable, particularly those used as safety equipment in manufacturing plants and similar.

1 Claim, 3 Drawing Sheets

GOGGLE FRAMES WITH QUICK FITTING SIDES

BACKGROUND OF THE INVENTION

The present invention is related to a disposition introduced in quick fitting in the assembly of sides in goggles frames, which development has as purpose to make very easier the assembly process and even the exchange broken sides in the goggles frame, making it fully dismountable, particularly those used as safety equipment in manufacturing plants and similar.

Several types and models of safety goggles are known, which must obligatorily be exchanged from time to time, reason by which they must have an unit cost very low and accessible. Those goggles, by their own nature, must be provided with side protections, incorporated to the banding sides or joint to the goggles frame itself.

The problem of those goggles is that, during or after the manufacturing of the frame and the sides, small metallic parts are applied, which will receive fittings of threaded metallic pins, which will operate as swiveling points, which assembly presents a relative complexity and which requires the use of specific machinery and very trained employees, in order to obtain a good productivity. However, due to their constructive form, they have low mechanical resistance in those points and, in case of break, it is required to dispose all the set and start the use of a new one.

Some trials to find a system of quick fitting of the sides, to allow the assembly and the exchange of the goggles parts were studied and produced, however resulting in complex solutions which do not presented proper safety, since those sides presented low resistance to the mechanical strains and the tendency to escape when in operation, mainly in the safety goggles.

SUMMARY OF THE INVENTION

In the patent herein requested, the disposition introduced in quick fitting in the assembly of sides in goggles frames is constituted by allow the manufacturing, thanks to the conformation in the injection tools, of proper ends in the goggles sides to allow a quick assembly, by pressure fitting, in a proper cradle, to their locking and articulation, in the goggles frame, releasing said machinery and reducing the specialized labor force. Therefore, the assembly time may be strongly reduced, besides of allow that, if required or desired, those sides be quickly exchanged, in case they are damaged or warn by the use, even by sides of different colors.

Said fitting, as a function of its constructive concept, does not present a volume easily perceptible and allows the quick assembly and disassembly of the goggles parts, which work must be performed with the removal of the transparent lens, since the long side will only be properly positioned and fitted through its insertion by the opening left upon the removal of that lens. The side, in its opening, is supported in a thin vertical wall, joint to the conformation for the sides articulation and which operates as opening limiter. Upon the assembly of the sides, the lenses are fitted again, which will operate as rotation stroke limiters and will prevent that the ideal point to the removal of the sides be achieved.

It is noted that this solution allows to substantially reduce the manufacturing and assembly cost, besides of warrant a higher safety as to the fixing of said sides, resulting in a very practical, safety and strong equipment, with low unit cost and, thanks to the possibility to the exchange the damaged parts, becomes even more economic.

BRIEF DESCRIPTION OF THE DRAWINGS

To a better understanding of the object of the present patent, there will be made references to the attached drawings, in which.

DETAILED DESCRIPTION OF THE INVENTION

Figure 1:
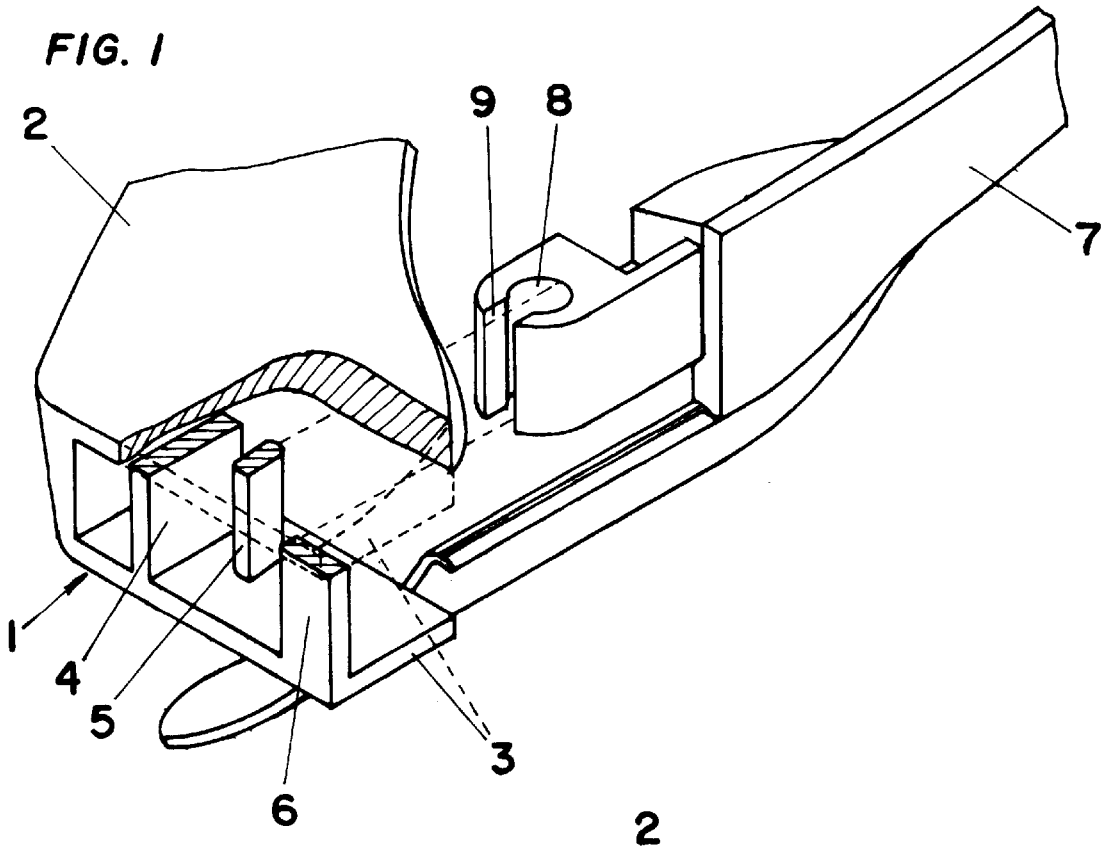
FIG. 1 shows, in back-superior view and with partial cut, the conformation of the side being positioned and fitted, under pressure, in the support conformed in the goggles frame.
Figure 2:
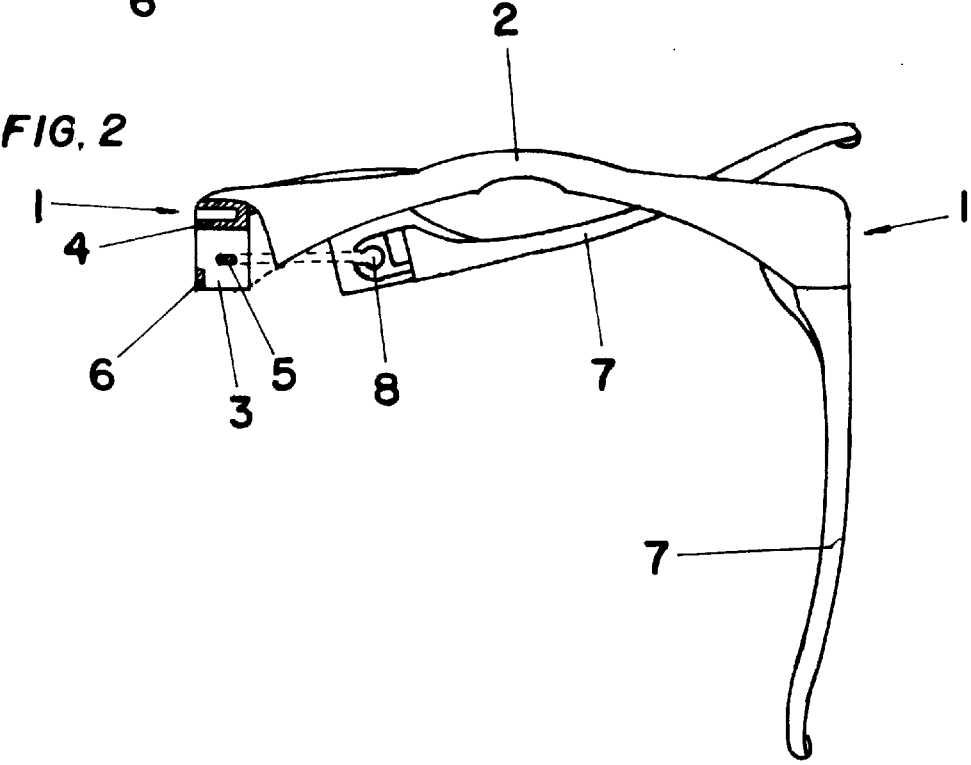
FIG. 2 shows, in superior view, said side crossing the opening where the transparent lens of the goggle is fixed (duly removed), being shown the only and correct position of side fitting and removal.
Figure 3:
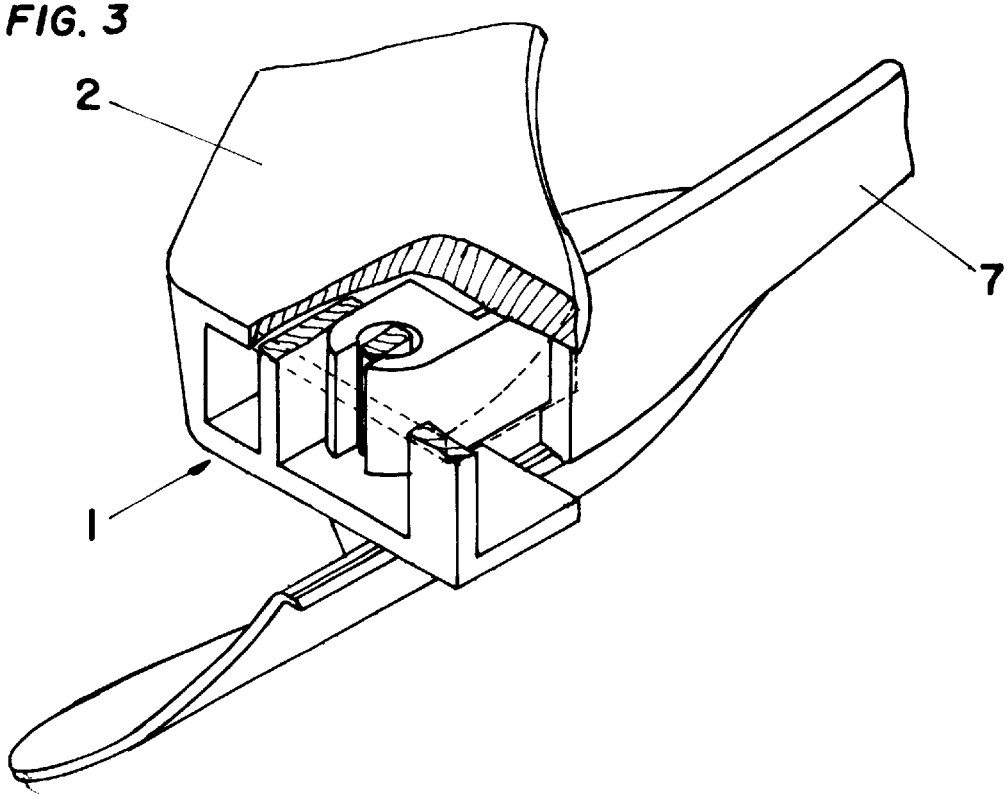
FIG. 3 shows, in back-superior view and with partial cut, the conformation of the side fitted in the support conformed in the goggle frame, duly assembled and with the transparent lens (not shown) operating as rotating limiter and preventing the removal of the sides.
Figure 4:
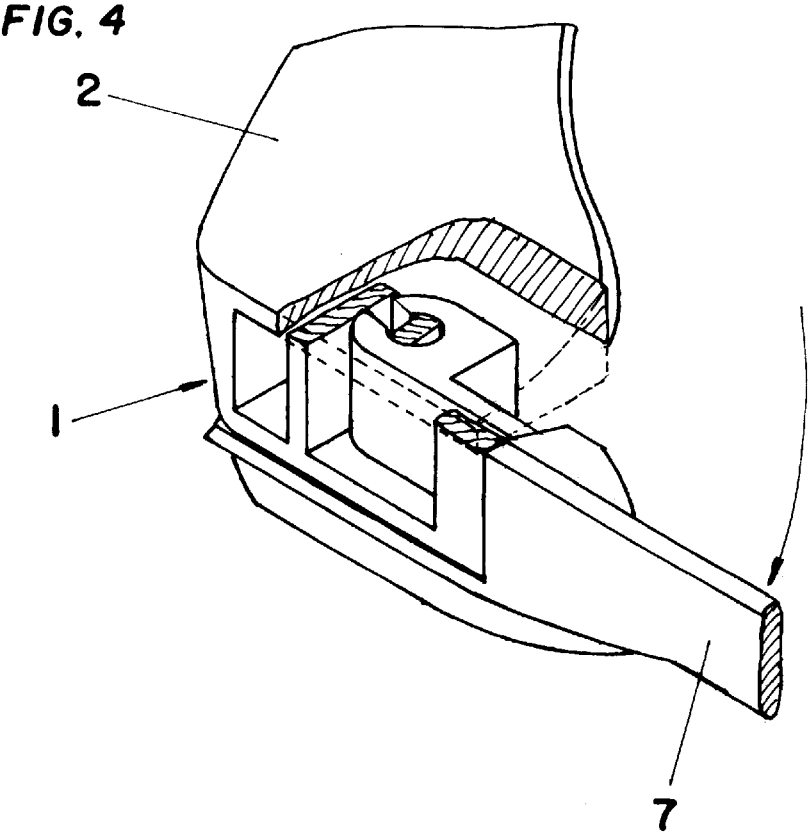
FIG. 4 shows, in back-superior view and with partial cut, the side duly fitted in the goggle frame support and with the side in opened position.
Figure 5:
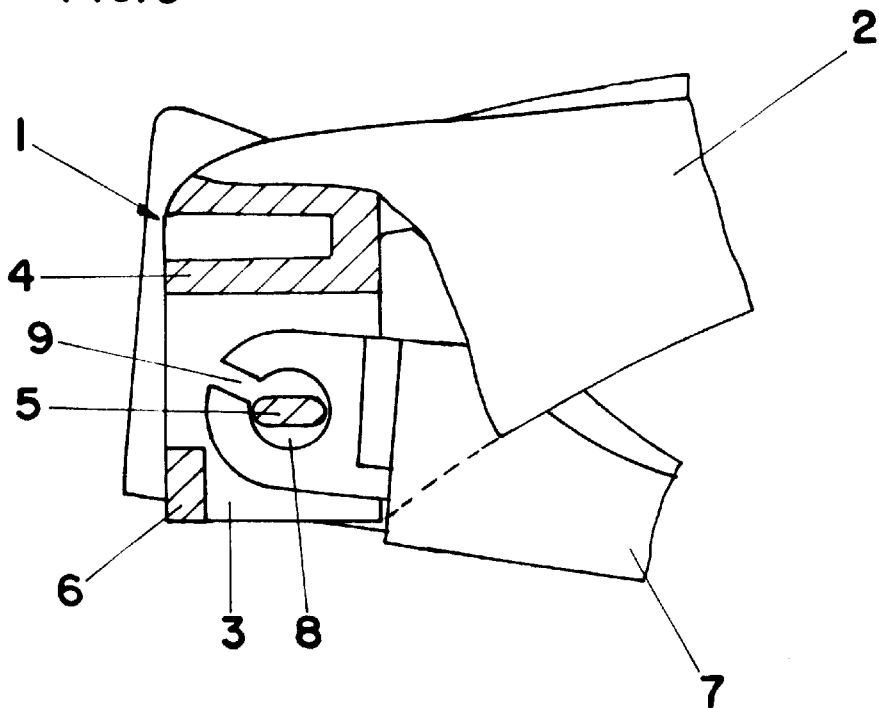
FIG. 5 shows, in superior view and with partial cut, the detail of the fitting conformation of the side fixed in the goggle frame conformation, said side in closed position and with said lens applied.
Figure 6:
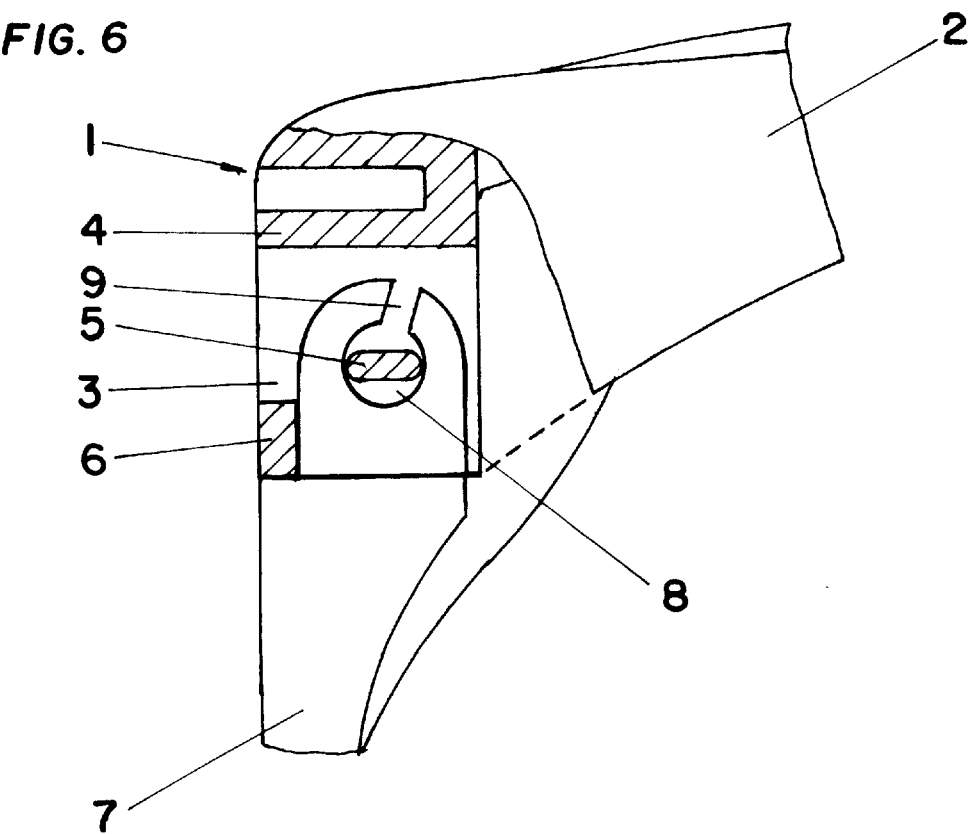
FIG. 6 shows, in superior view and with partial cut, the detail of the fitting conformation of the side fixed in the goggle frame conformation, said side in opened position.

The present invention is comprised of a conformation (1) joint to a goggle frame (2), basically composed by two horizontal and parallel plans (3) structured by a cross front-vertical blade (4), by a narrow side with elongated superior profile (5) and by a thin blade (6) which joins the back-side ends of said plans (3), with said profile (5) receiving the fitting, under pressure, of side (7) which trespass the hole of the transparent lens (duly removed) and the end of said side (7) having a conformation (8) properly reinforced and with an edge (9) to its fitting slightly inwards which, with the lens replacement, prevents the eventual escape and the fall of the goggles, said blade (6) operating as rotating limiter and preventing that the sides open more than the desired angle, as well as said lens operating as rotating limiter to avoid the removal ideal positioning of said side (7).

What is claimed is:

1. A goggle frame with quick fit sides, comprising: a frame member including a joint on each end thereof, each joint including two horizontal and parallel planes spaced from each other by a first vertically oriented cross blade adjacent a front of the planes, a second vertically oriented cross blade adjacent a back end of the planes, and an elongated profile extending between the two planes intermediate the first and second cross blades; each of the sides including a fitting at one end thereof adapted for detachable securement to a respective one of the joints of the frame member, each fitting including a recess and a slot extending through the fitting into communication with the recess, the slot being sized such that the elongated profile can be inserted therethrough and into the recess, whereby each side can be rotatably connected to the frame member; and each of the second cross blades being located so as to contact an exterior portion of the respective side so as to limit rotation of each side to an open position.

* * * * *